(12) United States Patent
Alexandrov et al.

(10) Patent No.: US 10,844,702 B2
(45) Date of Patent: Nov. 24, 2020

(54) PRECISION UTILITY MAPPING AND EXCAVATING USING PLASMA BLASTING

(71) Applicant: Petram Technologies, Inc., Cambridge, MA (US)

(72) Inventors: Igor S. Alexandrov, New York, NY (US); Frank A. Magnotti, Millburn, NJ (US)

(73) Assignee: Petram Technologies, Inc., Jersey City, NJ (US)

( * ) Notice: Subject to any disclaimer, the term of this patent is extended or adjusted under 35 U.S.C. 154(b) by 110 days.

(21) Appl. No.: 16/285,120

(22) Filed: Feb. 25, 2019

(65) Prior Publication Data

US 2019/0186249 A1    Jun. 20, 2019

Related U.S. Application Data

(60) Provisional application No. 62/645,247, filed on Mar. 20, 2018.

(51) Int. Cl.
*E21B 7/00* (2006.01)
*E21B 7/14* (2006.01)
(Continued)

(52) U.S. Cl.
CPC ............... *E21B 43/26* (2013.01); *F42D 1/10* (2013.01); *F42D 3/04* (2013.01); *F42D 3/06* (2013.01); *H05H 1/48* (2013.01); *H05H 1/52* (2013.01)

(58) Field of Classification Search
CPC ............... E02D 5/36; E02D 2300/002; E02D 2250/0023; H05H 1/52; H05H 1/2406;
(Continued)

(56) References Cited

U.S. PATENT DOCUMENTS 3,324,665 A  *  6/1967  Robichaux .............. E02D 5/808
                                                        405/244
3,553,969 A  *  1/1971  Chamberlin et al. ... E21B 43/36
                                                        405/210
(Continued)

FOREIGN PATENT DOCUMENTS

RU          2144980 C1     1/2000
RU          2184221 C1     6/2002
(Continued)

*Primary Examiner* — Edwin J Toledo-Duran
(74) *Attorney, Agent, or Firm* — Richard A. Baker, Jr.

(57) ABSTRACT

A method, system and apparatus for plasma blasting comprises a solid object having a borehole, a blast probe comprising a high voltage electrode and a ground electrode separated by a dielectric separator, wherein the high voltage electrode and the dielectric separator constitute an adjustable probe tip, and an adjustment unit coupled to the adjustable probe tip, wherein the adjustment unit is configured to selectively extend or retract the adjustable probe tip relative to the ground electrode and a blasting media, wherein at least a portion of the high voltage electrode and the ground electrode are submerged in the blast media. The blasting media comprises water. The adjustable tip permits fine-tuning of the blast. The blast can be used to fracture solids and/or to create a shockwave to mapping underground structures.

20 Claims, 11 Drawing Sheets

(51) Int. Cl.
*E21B 43/25* (2006.01)
*E21B 43/26* (2006.01)
*H05H 1/52* (2006.01)
*F42D 1/10* (2006.01)
*F42D 3/06* (2006.01)
*F42D 3/04* (2006.01)
*H05H 1/48* (2006.01)

(58) Field of Classification Search
CPC ..... H05H 2001/2412; E21B 7/28; E21B 7/15; E21B 43/24; E21B 43/243; E21B 43/2401; E21B 43/247; E21B 43/30; E21B 36/04; E21B 17/028; E21B 47/065; E21B 43/168; E21B 43/166
USPC ............... 405/229–257; 299/14, 16; 175/16; 166/63, 219; 102/313, 327
See application file for complete search history.

(56) References Cited

U.S. PATENT DOCUMENTS

| | | | | |
|---|---|---|---|---|
| 3,628,146 A * | 12/1971 | Beckman | H04B 1/20 | 455/142 |
| 3,679,007 A * | 7/1972 | O'Hare | E21B 7/15 | 175/16 |
| 3,763,610 A * | 10/1973 | Ballew | E02D 5/80 | 52/160 |
| 3,896,917 A * | 7/1975 | Taplin | B41J 3/51 | 400/131 |
| 4,074,758 A * | 2/1978 | Scott | E21B 17/003 | 166/177.1 |
| 4,169,503 A * | 10/1979 | Scott | E21B 17/003 | 166/177.1 |
| 4,222,684 A * | 9/1980 | Rosenstock | E02D 5/76 | 405/232 |
| 4,268,192 A * | 5/1981 | Colle | E02D 5/20 | 405/239 |
| 4,345,650 A * | 8/1982 | Wesley | E21B 36/04 | 166/177.2 |
| 4,465,401 A * | 8/1984 | Stoddord | E21B 33/138 | 299/11 |
| 4,479,680 A * | 10/1984 | Wesley | E21B 43/26 | 166/249 |
| 4,653,697 A * | 3/1987 | Codina | B02C 19/18 | 241/1 |
| 4,741,405 A * | 5/1988 | Moeny | E21B 7/15 | 175/16 |
| 4,806,153 A * | 2/1989 | Sakai | E21B 47/26 | 73/152.52 |
| 4,997,044 A | 3/1991 | Stack | | |
| 5,004,050 A * | 4/1991 | Sizonenko | E21B 43/003 | 166/248 |
| 5,106,164 A * | 4/1992 | Kitzinger | E21B 7/007 | 299/14 |
| 5,301,169 A * | 4/1994 | Baria | G01V 1/157 | 181/106 |
| 5,388,521 A * | 2/1995 | Coursen | F42D 1/00 | 102/311 |
| 5,397,961 A * | 3/1995 | Ayers | C02F 1/4608 | 315/111.21 |
| 5,416,391 A * | 5/1995 | Correa | H01J 17/063 | 307/106 |
| 5,425,570 A * | 6/1995 | Wilkinson | E21B 7/15 | 166/299 |
| 5,482,357 A * | 1/1996 | Wint | E21C 37/18 | 299/14 |
| 5,573,307 A * | 11/1996 | Wilkinson | F42D 3/00 | 299/14 |
| 5,773,750 A * | 6/1998 | Jae | F42D 3/00 | 102/302 |
| 5,980,446 A * | 11/1999 | Loomis | B09B 1/00 | 405/129.45 |
| 6,012,874 A * | 1/2000 | Groneck | E02D 5/38 | 405/239 |
| 6,227,293 B1 * | 5/2001 | Huffman | E21B 28/00 | 166/177.2 |
| 6,283,555 B1 * | 9/2001 | Arai | F42D 3/00 | 299/14 |
| 6,457,778 B1 * | 10/2002 | Chung | E21C 37/18 | 175/16 |
| 6,490,527 B1 * | 12/2002 | Utt | G01V 9/00 | 702/9 |
| 6,499,536 B1 * | 12/2002 | Ellingsen | E21B 43/2401 | 166/248 |
| 6,597,632 B2 * | 7/2003 | Khan | G01V 1/288 | 367/32 |
| 6,761,416 B2 * | 7/2004 | Moeny | E21C 37/16 | 175/16 |
| 6,772,105 B1 * | 8/2004 | Heck, Sr. | E21C 37/16 | 102/311 |
| 6,935,702 B2 * | 8/2005 | Okazaki | B02C 19/18 | 299/13 |
| 7,562,740 B2 * | 7/2009 | Ounadjela | G01V 1/143 | 181/113 |
| 7,849,919 B2 * | 12/2010 | Wood | H05H 1/52 | 166/248 |
| 8,616,302 B2 * | 12/2013 | Moeny | E21B 7/15 | 175/1 |
| 8,628,146 B2 * | 1/2014 | Baltazar-Lopez | F42D 1/10 | 299/14 |
| 8,789,772 B2 * | 7/2014 | Moeny | E21B 7/15 | 241/1 |
| 9,181,788 B2 * | 11/2015 | Ageev | E21B 43/24 | |
| 9,719,302 B2 * | 8/2017 | Linyaev | E21B 7/15 | |
| 9,739,574 B1 * | 8/2017 | Vijay | B05B 17/0653 | |
| 9,770,724 B2 * | 9/2017 | Vijay | B08B 3/10 | |
| 9,816,356 B2 * | 11/2017 | Ageev | E21B 43/2405 | |
| 9,896,917 B2 * | 2/2018 | Sizonenko | E21B 43/25 | |
| 10,060,195 B2 * | 8/2018 | Moeny | E21B 7/15 | |
| 10,254,499 B1 * | 4/2019 | Cohen | B23K 1/19 | |
| 10,280,723 B2 * | 5/2019 | Ageev | E21B 28/00 | |
| 10,407,995 B2 * | 9/2019 | Moeny | E21B 17/003 | |
| 2001/0011590 A1 * | 8/2001 | Thomas | E21B 28/00 | 166/248 |
| 2006/0038437 A1 * | 2/2006 | Moeny | E21B 7/00 | 299/14 |
| 2007/0292215 A1 * | 12/2007 | Kim | E02D 5/445 | 405/232 |
| 2010/0270038 A1 * | 10/2010 | Looney | E21B 43/241 | 166/402 |
| 2011/0139441 A1 * | 6/2011 | Zolezzi Garreton | E21B 28/00 | 166/249 |
| 2011/0227395 A1 * | 9/2011 | Baltazar-Lopez | F42D 3/04 | 299/14 |
| 2012/0043075 A1 * | 2/2012 | Abramova | E21B 43/003 | 166/249 |
| 2014/0027110 A1 * | 1/2014 | Ageev | E21B 43/24 | 166/249 |
| 2014/0251599 A1 * | 9/2014 | Linetskiy | E21B 43/30 | 166/248 |
| 2016/0168815 A1 * | 6/2016 | Kemp | E04H 12/20 | 52/157 |
| 2017/0002535 A1 * | 1/2017 | Surjaatmadja | E02D 3/12 | |

FOREIGN PATENT DOCUMENTS

| | | |
|---|---|---|
| RU | 2194846 C2 | 12/2002 |
| RU | 2199659 C1 | 2/2003 |
| RU | 2213860 C2 | 10/2003 |
| RU | 2261986 C1 | 10/2005 |
| RU | 2272128 C1 | 3/2006 |
| RU | 2282021 C1 | 8/2006 |
| RU | 2283950 C2 | 9/2006 |
| RU | 2295031 C2 | 3/2007 |
| RU | 2298641 C2 | 5/2007 |
| RU | 2298642 C2 | 5/2007 |
| RU | 2314412 C1 | 1/2008 |
| RU | 2317409 C1 | 2/2008 |
| RU | 2327027 C2 | 6/2008 |

(56) References Cited

FOREIGN PATENT DOCUMENTS

| | | |
|---|---|---|
| RU | 2007101698 A | 7/2008 |
| RU | 2335658 C2 | 10/2008 |
| RU | 2520672 C2 | 4/2014 |

* cited by examiner

PRECISION UTILITY MAPPING AND EXCAVATING USING PLASMA BLASTING

CROSS REFERENCE TO RELATED APPLICATIONS

This patent application is a non-provisional application of, and claims the benefit of the filing dates of, U.S. Provisional Patent Application 62/645,247, "Precision Utility Mapping and Excavating Using Plasma Blasting", filed on Mar. 20, 2018. The disclosures of this provisional patent application is incorporated herein by reference.

This provisional application draws from U.S. Pat. No. 8,628,146, filed by Martin Baltazar-Lopez and Steve Best, issued on Jan. 14, 2010, entitled "Method of and apparatus for plasma blasting". The entire patent incorporated herein by reference.

BACKGROUND

Technical Field

The present invention relates to the field of utility mapping and excavating. More specifically, the present invention relates to the field of precision plasma blasting using techniques to map underground structures and precisely excavate these structures.

Description of the Related Art

Public utility systems are often run underground; some by the very nature of their function, others for convenience or aesthetics. Before digging for repair, renovation or inspection, local governments often require that the underground systems' locations be denoted and approved, if it is to be in the public right-of-way.

Because of the many different types of materials that go into manufacturing each of the different types of underground lines, different detection and location methods must be used. For metal pipes and cables, this is often done with electromagnetic equipment consisting of a transmitter and a receiver. For other types of pipe, such as plastic or concrete, other types of radiolocation or modern ground-penetrating radar or ultrasound location systems must be used. Location by these technical means is necessary because maps often lack the pinpoint precision needed to ensure proper clearance. In older cities, it is especially a problem since maps may be very inaccurate, or may be missing entirely.

In many cities, high voltage electrical feeds are run through conduit underground. To protect the conduit, utilities often pour concrete over the conduit in varying thicknesses. The concrete works well to protect the conduit from inadvertent damage from other contractors working on other underground utilities. But the concrete presents problems when the high voltage feeds need to be serviced. To clear the concrete, jackhammers are used to break it up. But this can create safety issues should the jackhammer break into the conduit and come in contact with the electrical feeds. Also, the sound of jackhammers can be unacceptable in urban settings, and the high level of vibration can be very dangerous for an operator. A better solution is needed to locate and clear the conduit.

Similarly, gas mains in cities are often encapsulated in concrete to protect the mains from inadvertent damage from digging by other utility companies or from impacts from the ground. When a gas main requires maintenance, the actual location of the main must be precisely located and the concrete carefully removed without breaking the main, which may still have gas running through it. Jackhammers and explosives, normally used for excavating, are dangerous with explosive gas in the main. Again, a better solution to locating the gas main and precisely removing the concrete is needed.

Similar challenges exist in the oil and gas exploration (and other mineral mining) fields where unknown reserves need to be located deep underground. A pulse source is used to generate controlled seismic-acoustic signals to perform both reflection and refraction seismic surveys. A pulse source can be simple, such as a dynamite charge, or it can use more sophisticated technology, such as a specialized air gun. Pulse sources can provide single pulses or continuous sweeps of energy, generating seismic-acoustic waves, which travel through a medium such as water or layers of rocks. Some of the waves then reflect and refract and are recorded by receivers, such as geophones, seismographs, or hydrophones positioned in known locations relatively far from the pulse source. The recorded signals are then subjected to specialist processing and interpretation to yield comprehensible information about the deep subsurface. This technology is widely used for oil and gas exploration.

Pulse sources also may be used to investigate shallow subsoil structure, for engineering site characterization, or to map subsurface faults or for other engineering and scientific investigations. The returning signals from the pulse sources are detected by seismic sensors (geophones or hydrophones) in known locations in local proximity to the position of the source.

But the use of explosives as a pulse source of seismic-acoustic signals suffers from the chemical waste product and the difficulty controlling the blast energy and emitting signal spectrum and direction with any precision. Explosives are unavailable in many situations where the use of such pulse seismic-acoustic signal sources are prohibited due to safety, vibration, and/or pollution concerns. A better solution to this problem is needed.

An alternate method of creating seismic-acoustic signals in the form of shock waves for the location of underground structures incorporates the use of electrically powered plasma blasting. In this method, a capacitor bank is charged over a relatively long period of time at a low current, and then discharged in a very short pulse at a very high current into a blasting probe comprised of two or more electrodes immersed in an incompressible fluid media. The fluid media is in direct or indirect contact with the ground creating shock waves in the ground. These plasma blasting probes however, have been historically expensive due to their inefficiency.

Previous plasma blasting probes suffered from difficulties in reusability due to the lack of control of the dynamics of the plasma spark. This lack of control also prevented the aiming of the shock waves from the blast into a desired direction.

The present invention, eliminates the issues articulated above as well as other issues with the currently known products.

SUMMARY OF THE INVENTION

An underground structure locating apparatus and method is described that uses a high voltage capacitor discharge in an incompressible fluid to generate shock waves through the ground, where the reflections of the shock waves are detected and processed to create a tomogram or 3-dimensional map of the underlying structures. In some situations a borehole is drilled and a blast probe is inserted in the borehole, the probe having a plurality of electrodes, wherein the blast probe is positioned within the borehole, wherein at least two of the plurality of electrodes are separated by a dielectric separator. The blast probe wherein the dielectric separator and at least one of the plurality of electrodes constitute an adjustable probe tip, the electrodes on the same axis with tips opposing each other, the electrodes enclosed in a cage. A blast media made of water or other incompressible fluid wherein the electrodes are submerged in the blast media. Once the plasma blast occurs, the shock waves traveling through the ground are detected by a sensor.

In another embodiment, the plasma blast occurs in an aboveground probe, where the probe has a parabolic mirror to direct the energy from the blast at a mechanical slug that is connected to the ground. The slug sends shock waves into the ground, where the reflections are detected by sensors. In some embodiments, the blast is repeated a plurality of times in a pattern to map the underground structure.

A utility detection system is described herein. The utility detection system includes a platform with at least three wheels and a frame mounted on a deck of the platform. The frame has a plurality of sensors (such as GPS sensors, sound or shockwave detectors, etc) and one or more plasma blasting probes. The probes are made up of a cylindrical shaped probe housing with a slug positioned at the bottom, a plurality of electrodes positioned in the probe housing, where the electrodes positioned in a central location within a parabolic mirror such that the parabolic mirror focuses the shockwaves from a plasma blast caused by an arc between the plurality of electrodes onto the slug.

In some embodiments, the utility detection system also includes a special purpose controller mounted on the platform and electrically connected to the plurality of sensors and to the electrodes. This controller could execute an algorithm that automatically determines an amount of energy sent to the electrodes. The algorithm could also automatically determines a timing of energy sent to the electrodes. The algorithm could also create a map of underground structures based on data from the sensors. The algorithm could determine the precision of the map. In some embodiments, the underground structures are gas lines, in other embodiments they are electrical lines, water lines, sewer line, cable, phone, etc.

In some embodiments, the utility detection system includes a borehole drilling mechanism and a downhole blast probe. In some of these cases, the controller executes an algorithm that automatically calculates parameters of the plasma blast to fracture underground structures. The algorithm could automatically calculate parameters of the plasma blast so that a first blast coarsely fractures the underground structures and later precisely fractures the underground structures.

A method for detecting underground utilities is also described herein. The method includes the steps of initiating a plasma blast between a plurality of electrodes positioned within a plasma blasting probe, where the plurality of electrodes are positioned in a central location inside of a parabolic mirror, so that the focus of the shockwaves from the plasma blast are sent onto a slug. The slug is in contact with a surface, such as the ground or pavement. The next step in the method includes detecting, with sensors, the reflections from the shockwaves off of structures underneath the surface, and executing an algorithm on a special purpose controller to process the signals from the sensors representing the reflections of the shockwaves. Finally, the method includes the step of mapping the location of the structures underneath the ground from the signals.

In some embodiments, the plasma blasting probe includes a housing in the shape of a cylinder. In some embodiments, the method also includes the step of executing, by the special purpose controller, an algorithm that automatically determines an amount of energy sent to the electrodes. In some further embodiments, the steps include executing, by the special purpose controller, an algorithm that automatically determines a timing of energy sent to the electrodes. In other embodiments, the method also includes the step of executing, by the special purpose controller, an algorithm that creates a map of the structures underneath the surface based on data from the plurality of sensors. The algorithm could also determine the precision of the map. In some embodiments, the underground structures are gas lines, in other embodiments they are electrical lines, water lines, sewer line, cable, phone, etc.

The method could also include the step of drilling a borehole using a drilling mechanism and a downhole blast probe. And in some cases executing, by the special purpose controller, an algorithm that automatically calculates parameters of the plasma blast to fracture the structures underneath the surface. The algorithm could also automatically calculates parameters of the plasma blast to first coarsely fracture the structures underneath the surface and later to precisely fracture the structures underneath the surface.

DETAILED DESCRIPTION OF THE INVENTION

Figure 1:
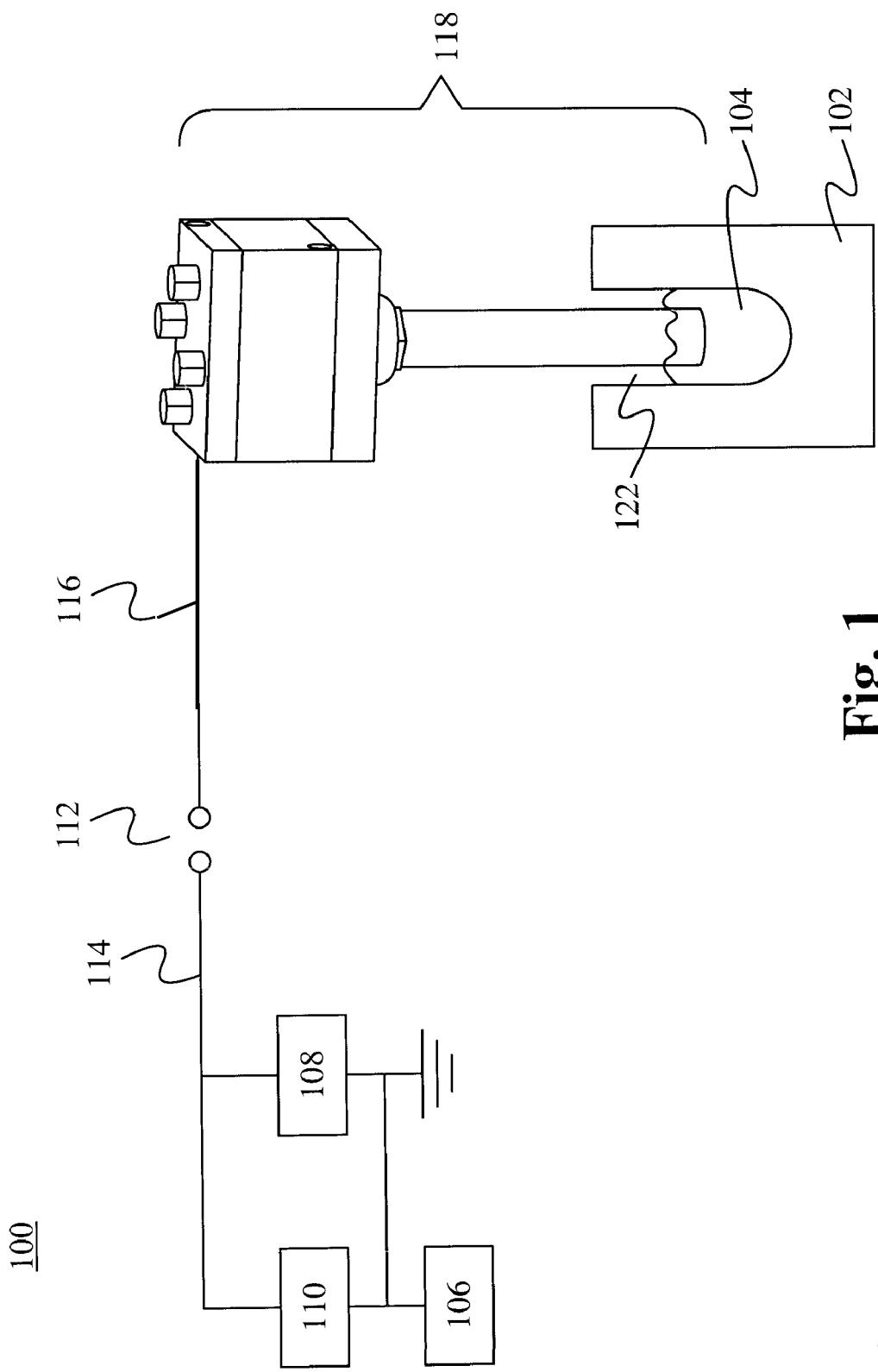
FIG. 1 shows the plasma blasting system in accordance with some embodiments of the Present Application.

FIG. 1 illustrates a plasma blasting system 100 for fracturing a solid 102 in accordance with some embodiments where electrical energy is deposited at a high rate (e.g. a few microseconds), into a blasting media 104 (e.g. water), wherein this fast discharge in the blasting media 104 creates plasma confined in a borehole 122 within the solid 102. A pressure wave created by the discharge plasma emanates from the blast region thereby fracturing the solid 102. This plasma blasting system 100 can also be used to create a shock wave in the ground (or in a solid) to allow the mapping of the ground by sensing the reflections of the shock wave and interpreting the structure of the ground.

The Plasma Blasting System

In some embodiments, the plasma blasting system 100 comprises a power supply 106, an electrical storage unit 108, a voltage protection device 110, a high voltage switch 112, a transmission line 114, an inductor cable 116, a blasting probe 118 and a blasting media 104. In some embodiments, the plasma blasting system 100 comprises any number of blasting probes and corresponding blasting media. The power supply 106 comprises any electrical power supply capable of supplying a sufficient voltage to the electrical storage unit 108. The electrical storage unit 108 comprises a capacitor bank or any other suitable electrical storage means. The voltage protection device 110 comprises a crowbar circuit, with voltage-reversal protection means as is well known in the art. The high voltage switch 112 comprises a spark gap, an ignitron, a solid state switch, or any other switch capable of handling high voltages and high currents. In some embodiments, the transmission line 114 comprises a coaxial cable. Alternatively, the transmission line 114 comprises any transmission cable capable of adequately transmitting the pulsed electrical power.

In some embodiments, the power supply 106 couples to the voltage protection device 110 and the electrical storage unit 108 via the transmission line 114 such that the power supply 106 is able to supply power to the electrical storage unit 108 through the transmission line 114 and the voltage protection device 110 is able to prevent voltage reversal from harming the system. In some embodiments, the power supply 106, voltage protection device 110 and electric storage unit 108 also couple to the high voltage switch 112 via the transmission line 114 such that the switch 112 is able to receive a specified voltage/current from the electric storage unit 108. The switch 112 then couples to the cable 116 which couples to the blasting probe 118 again via the transmission line 114 such that the switch 112 is able to selectively allow the specified voltage/amperage received from the electric storage unit 108 to be transmitted through the cable 116 to the blasting probe 118.

Simple Plasma Blasting Probe

Figure 2A:
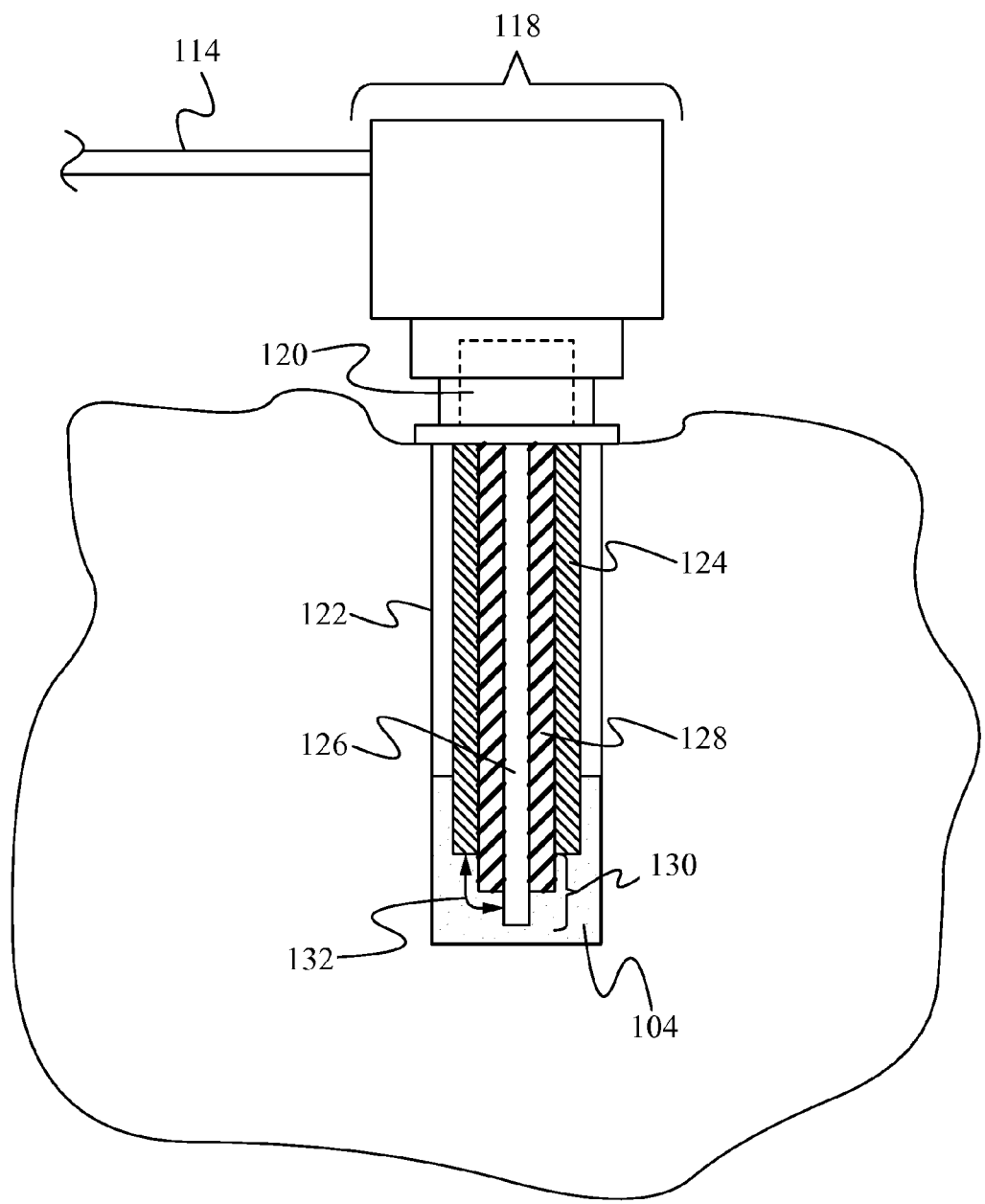
FIG. 2A shows a close up view of the blasting probe in accordance with some embodiments of the Present Application.
Figure 2B:
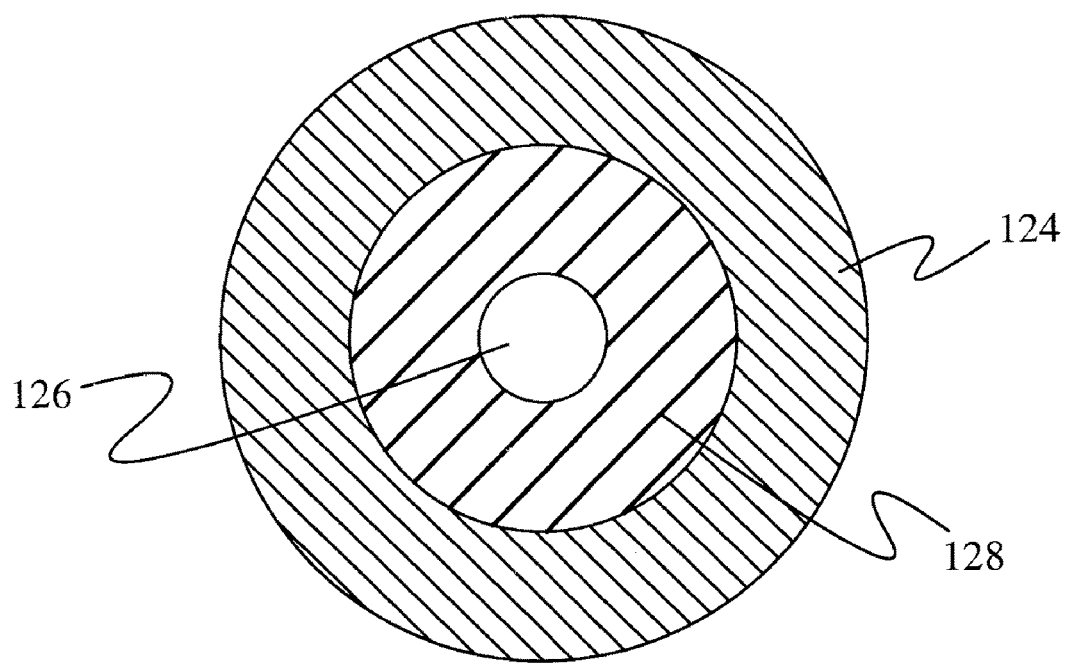
FIG. 2B shows an axial view of the blasting probe in accordance with some embodiments of the Present Application.
Figure 5:
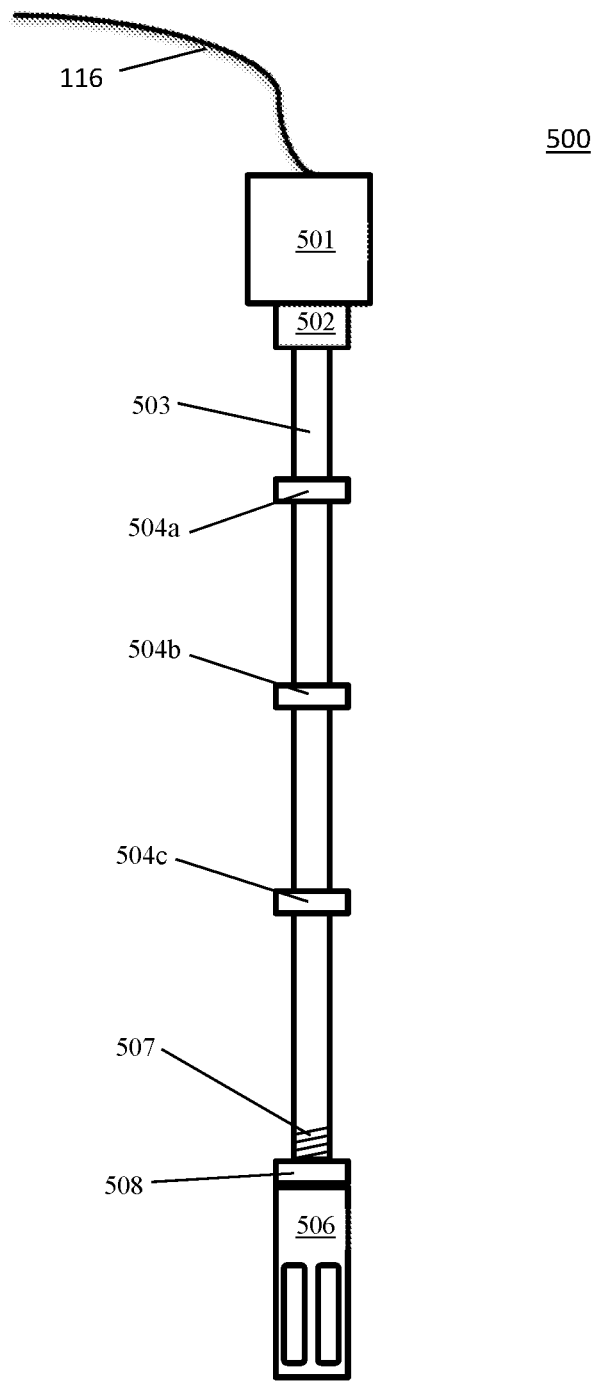
FIG. 5 shows a drawing of the improved probe from the top to the blast tip.
Figure 6:
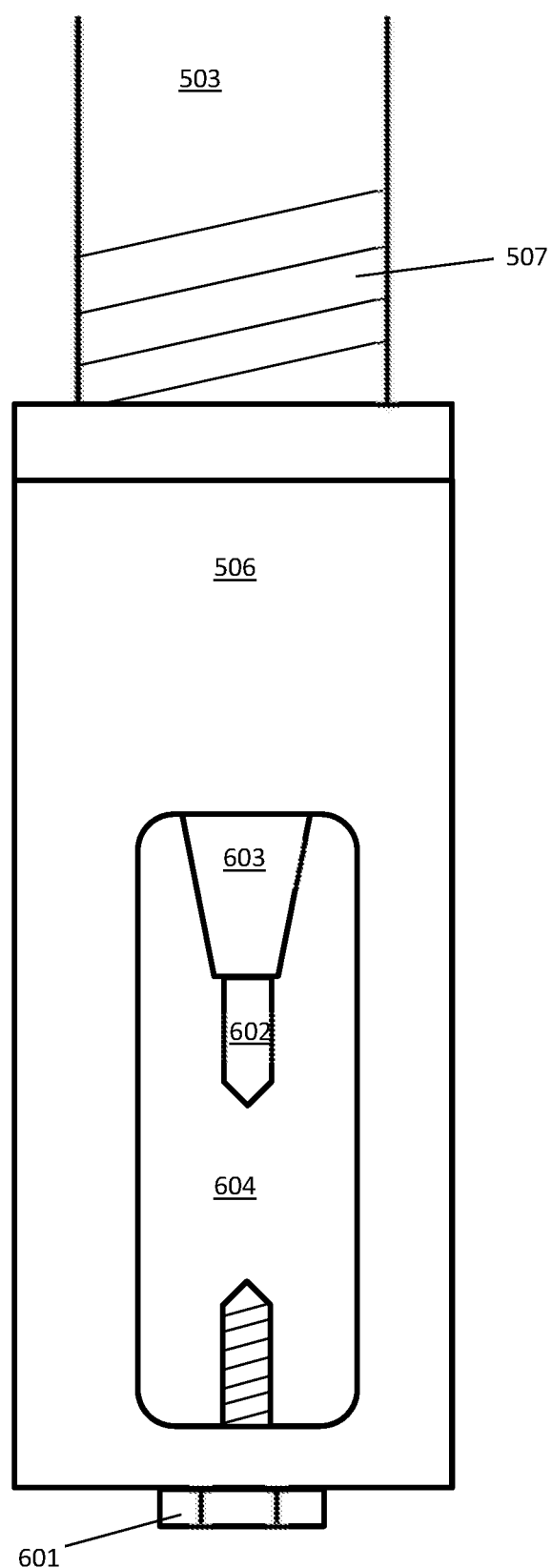
FIG. 6 shows a detailed view into the improved blast tip.

FIG. 2A shows one embodiment for a blasting probe. FIGS. 5 and 6 show another embodiment. As seen in FIG. 2A, the blasting probe 118 comprises an adjustment unit 120, one or more ground electrodes 124, one or more high voltage electrodes 126 and a dielectric separator 128, wherein the end of the high voltage electrode 126 and the dielectric separator 128 constitute an adjustable blasting probe tip 130. The adjustable blasting probe tip 130 is reusable. Specifically, the adjustable blasting probe tip 130 comprises a material and is configured in a geometry such that the force from the blasts will not deform or otherwise harm the tip 130. Alternatively, any number of dielectric separators comprising any number and amount of different dielectric materials are able to be utilized to separate the ground electrode 124 from the high voltage electrode 126. In some embodiments, as shown in FIG. 2B, the high voltage electrode 126 is encircled by the hollow ground electrode 124. Furthermore, in those embodiments the dielectric separator 128 also encircles the high voltage electrode 126 and is used as a buffer between the hollow ground electrode 124 and the high voltage electrode 126 such that the three 124, 126, 128 share an axis and there is no empty space between the high voltage and ground electrodes 124, 126. Alternatively, any other configuration of one or more ground electrodes 124, high voltage electrodes 126 and dielectric separators 128 are able to be used wherein the dielectric separator 128 is positioned between the one or more ground electrodes 124 and the high voltage electrode 126. For example, the configuration shown in FIG. 2B could be switched such that the ground electrode was encircled by the high voltage electrode with the dielectric separator again sandwiched in between, wherein the end of the ground electrode and the dielectric separator would then comprise the adjustable probe tip.

The adjustment unit 120 comprises any suitable probe tip adjustment means as are well known in the art. Further, the adjustment unit 120 couples to the adjustable tip 130 such that the adjustment unit 120 is able to selectively adjust/move the adjustable tip 130 axially away from or towards the end of the ground electrode 124, thereby adjusting the electrode gap 132. In some embodiments, the adjustment unit 120 adjusts/moves the adjustable tip 130 automatically. The term "electrode gap" is defined as the distance between the high voltage and ground electrode 126, 124 through the blasting media 104. Thus, by moving the adjustable tip 130 axially in or out in relation to the end of the ground electrode 124, the adjustment unit 120 is able to adjust the power of the blasting probe 118. As a result, a change in the distance separating the electrodes 124, 126 in the blasting probe 118 is able to be used to vary the electrical power deposited into the solid 102 to be broken or fractured. Accordingly, by allowing more refined control over the electrode gap 132 via the adjustable tip 130, better control over the blasting and breakage yield is able to be obtained.

Figure 3:
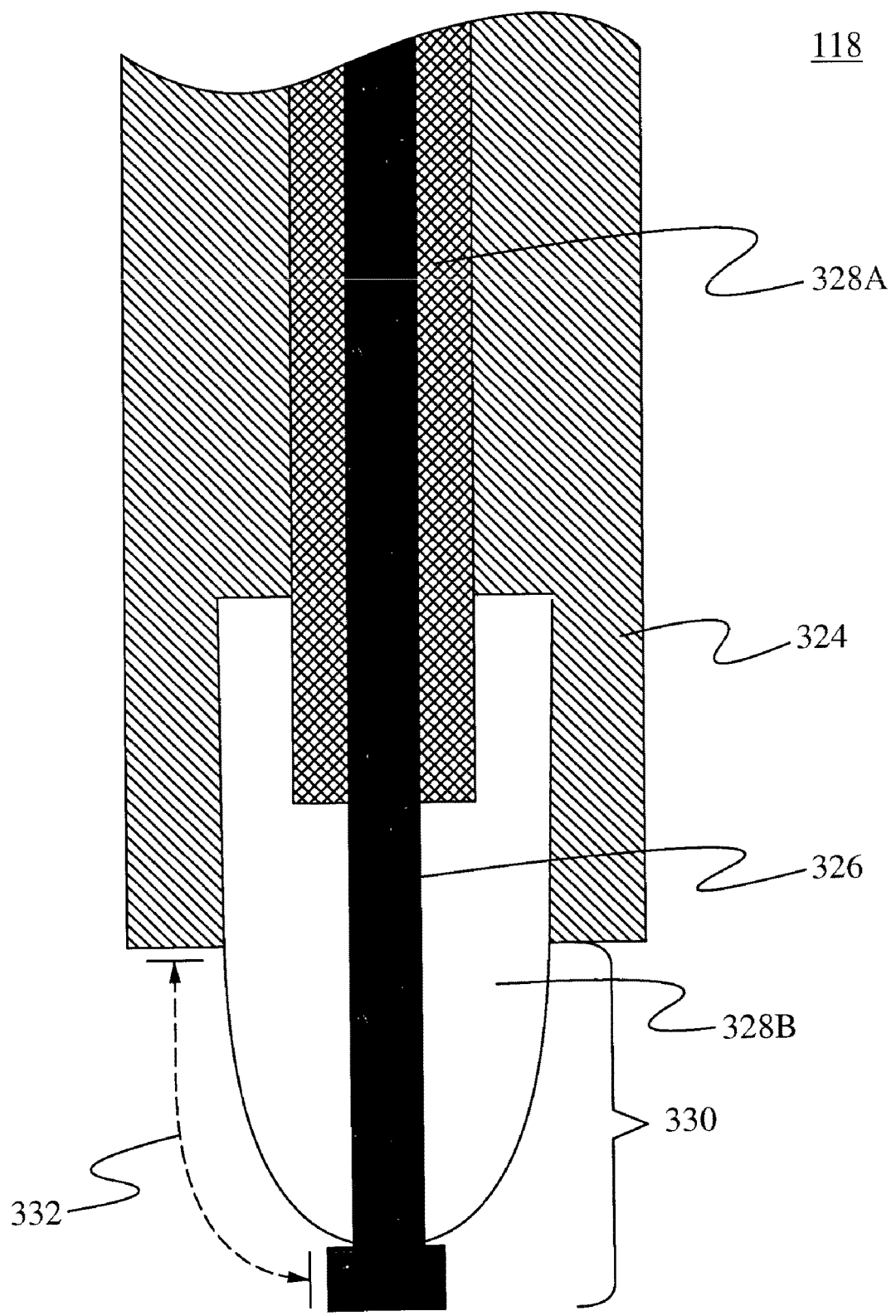
FIG. 3 shows a close up view of the blasting probe comprising two dielectric separators for high energy blasting in accordance with some embodiments of the Present Application.

Another embodiment, as shown in FIG. 3, is substantially similar to the embodiment shown in FIG. 2A except for the differences described herein. As shown in FIG. 3, the blasting probe 118 comprises an adjustment unit (not shown), a ground electrode 324, a high voltage electrode 326, and two different types of dielectric separators, a first dielectric separator 328A and a second dielectric separator 328B. Further, in this embodiment, the adjustable blasting probe tip 330 comprises the end portion of the high voltage electrode 326 and the second dielectric separator 328B. The adjustment unit (not shown) is coupled to the high voltage electrode 326 and the second dielectric separator 328B (via the first dielectric separator 328A), and adjusts/moves the adjustable probe tip 330 axially away from or towards the end of the ground electrode 324, thereby adjusting the electrode gap 332. In some embodiments, the second dielectric separator 328B is a tougher material than the first dielectric separator 328A such that the second dielectric separator 328B better resists structural deformation and is therefore able to better support the adjustable probe tip 330. Similar to the embodiment in FIG. 2A, the first dielectric 328A is encircled by the ground electrode 324 and encircles the high voltage electrode 326 such that all three share a common axis. However, unlike FIG. 2A, towards the end of the high voltage electrode 326, the first dielectric separator 328A is supplanted by a wider second dielectric separator 328B which surrounds the high voltage electrode 326 and forms a conic or parabolic support configuration as illustrated in the FIG. 3. The conic or parabolic support configuration is designed to add further support to the adjustable probe tip 330. Alternatively, any other support configuration could be used to support the adjustable probe tip. Alternatively, the adjustable probe tip 330 is configured to be resistant to deformation. In some embodiments, the second dielectric separator comprises a polycarbonate tip. Alternatively, any other dielectric material is able to be used. In some embodiments, only one dielectric separator is able to be used wherein the single dielectric separator both surrounds the high voltage electrode throughout the blast probe and forms the conic or parabolic support configuration around the adjustable probe tip. In particular, the embodiment shown in FIG. 3 is well suited for higher power blasting, wherein the adjustable blast tip tends to bend and ultimately break. Thus, due to the configuration shown in FIG. 3, the adjustable probe tip 330 is able to be reinforced with the second dielectric material 328B in that the second dielectric material 328B is positioned in a conic or parabolic geometry around the adjustable tip such that the adjustable probe tip 330 is protected from bending due to the blast.

In one embodiment, water is used as the blasting media 104. The water could be poured down the borehole 122 before or after the probe 118 is inserted in the borehole 122. In some embodiments, such as horizontal boreholes 122 or bore holes 122 that extend upward, the blasting media 104 could be contained in a balloon or could be forced under pressure into the borehole 122 with the probe 118.

As shown in FIGS. 1 and 2, the blasting media 104 is positioned within the borehole 122 of the solid 102, with the adjustable tip 130 and at least a portion of the ground electrode 124 suspended within the blasting media 104 within the solid 102. Correspondingly, the blasting media 104 is also in contact with the inner wall of the borehole 122 of the solid 102. The amount of blasting media 104 to be used is dependent on the size of the solid and the size of the blast desired and its calculation is well known in the art.

Figure 4:
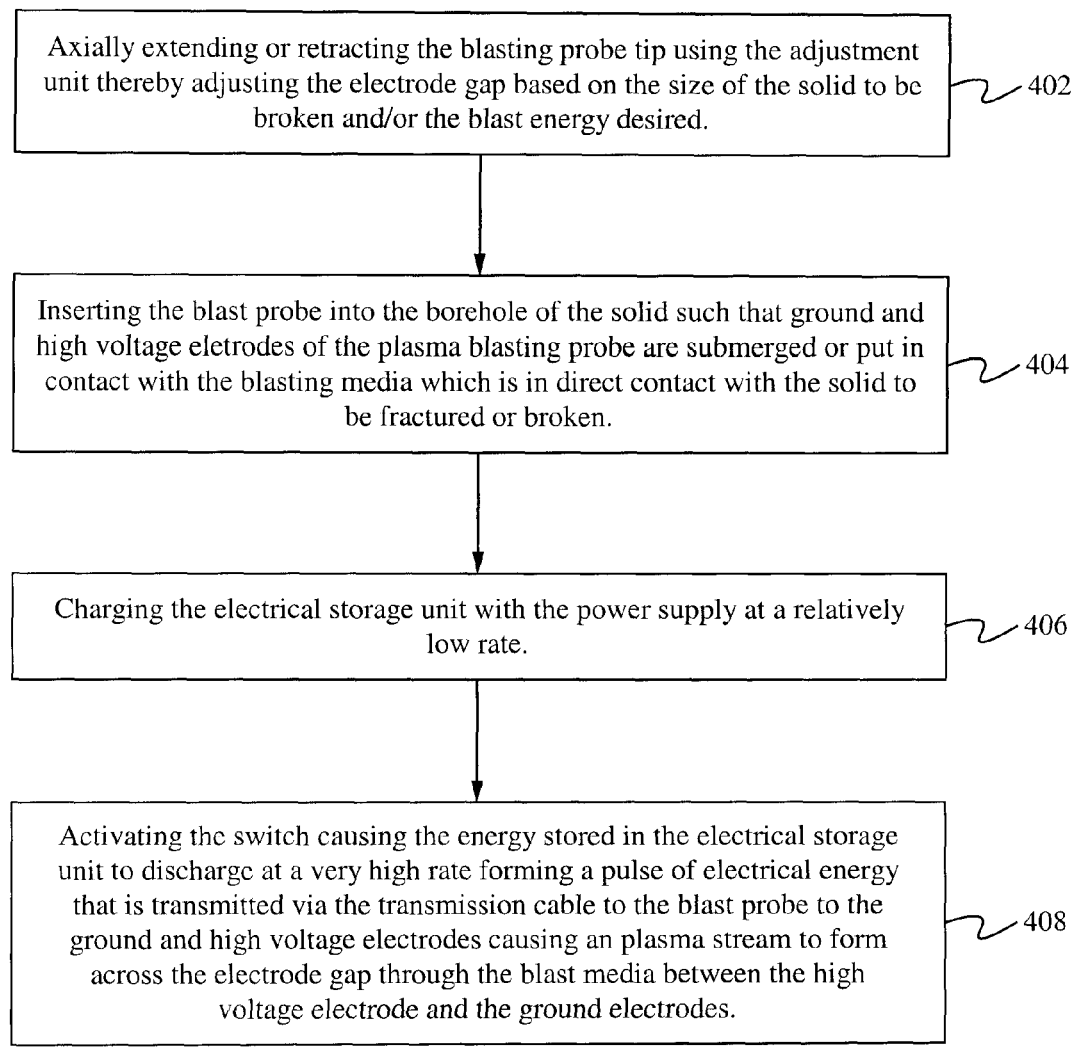
FIG. 4 shows a flow chart illustrating a method of using the plasma blasting system to break or fracture a solid in accordance with some embodiments of the Present Application.

The method and operation 400 of the plasma blasting system 100 will now be discussed in conjunction with a flow chart illustrated in FIG. 4. In operation, as shown in FIGS. 1 and 2, the adjustable tip 130 is axially extended or retracted by the adjustment unit 120 thereby adjusting the electrode gap 132 based on the size of the solid 102 to be broken and/or the blast energy desired at the step 402. The blast probe 118 is then inserted into the borehole 122 of the solid such that at least a portion of the ground and high voltage electrodes 124, 126 of the plasma blasting probe 118 are submerged or put in contact with the blasting media 104 which is in direct contact with the solid 102 to be fractured or broken at the step 404. Alternatively, the electrode cap 132 is able to be adjusted after insertion of the blasting probe 118 into the borehole 122. The electrical storage unit 108 is then charged by the power supply 106 at a relatively low rate of speed (e.g., a few seconds) at the step 406. The switch 112 is then activated causing the energy stored in the electrical storage unit 108 to discharge at a very high rate of speed (e.g. tens of microseconds) forming a pulse of electrical energy (e.g. tens of thousands of Amperes) that is transmitted via the transmission line 114 and cable 116 to the plasma blasting probe 118 to the ground and high voltage electrodes 124, 126 causing a plasma stream to form across the electrode gap 132 through the blast media 104 between the high voltage electrode 126 and the ground electrode 124 at the step 408.

During the first microseconds of the electrical breakdown, the blasting media 104 is subjected to a sudden increase in temperature (e.g. about 5000 to 10,000° C. or more) due to a plasma channel formed between the electrodes 124, 126, which is confined in the borehole 122 and not able to dissipate. The heat generated vaporizes or reacts with part a the blasting media 104, creating a steep pressure rise confined in the borehole 122. Because the discharge is very brief, a blast wave comprising a layer of compressed water (or other blasting media 104) is formed in front of the vapor containing most of the energy from the discharge. It is this blast wave that then applies force to the inner walls of the borehole 122 and ultimately breaks or fractures the solid 102. Specifically, when the pressure expressed by the wave front (which is able to reach up to 2.5 GPa and over), exceeds the tensile strength of the solid 102, fracture is expected. Thus, the blasting ability depends on the tensile strength of the solid 102 where the plasma blasting probe 118 is placed, and on the intensity of the pressure formed. The plasma blasting system 100 described herein is able to provide pressures well above the tensile strengths of common rocks (e.g. granite=10-20 MPa, tuff=1-4 MPa, and concrete=7 MPa). Thus, the major cause of the fracturing or breaking of the solid 102 is the impact of this compressed water shock wave front which is comparable to one resulting from a high-energy chemical explosive (e.g., dynamite).

During testing, the blast probe of the blasting system described herein was inserted into solids comprising either concrete or granite with cast or drilled boreholes having a one inch diameter. A capacitor bank system was used for the electrical storage unit and was charged at a low current and then discharged at a high current via the high voltage switch 112. Peak power achieved was measured in the gigawatts. Pulse rise times were around 10-20 μsec and pulse lengths were on the order of 50-100 μsec. The system was able to produce pressures of up to 2.5 GPa and break concrete and granite blocks with masses of more than 850 kg with one discharge.

Advanced Plasma Blasting Probe

FIG. 5 shows an alternative probe 500 embodiment. Probe coupler 501 electrically connects to cable 116 for receiving power from the capacitors 108 and mechanically connects to tethers (could be the cable 116 or other mechanical devices to prevent the probe 500 from departing the borehole 122 after the blast. The probe coupler 501 may incorporate a high voltage coaxial BNC-type high voltage/high current connector to compensate lateral Lorentz' forces on the central electrode and to allow for easy connection of the probe 500 to the cable 116. The mechanical connection may include an eye hook to allow carabiners or wire rope clip to connect to the probe 500. Other mechanical connections could also be used. The probe connection 501 could be made of plastic or metal. The probe connector 501 could be circular in shape and 2 inches in diameter for applications where the probe is inserted in a borehole 122 that is the same depth as the probe 500. In other embodiments, the probe 500 may be inserted in a deep hole, in which case the probe connector 501 must be smaller than the borehole 122.

The probe connector 501 is mechanically connected to the shaft connector 502 with screws, welds, or other mechanical connections. The shaft connector 502 is connected to the probe shaft 503. The connection to the probe shaft 503 could be through male threads on the top of the probe shaft 503 and female threads on the shaft connector 502. Alternately, the shaft connector 502 could include a set screw on through the side to keep the shaft 503 connected to the shaft connector 502. The shaft connector 502 could be a donut shape and made of stainless steel, copper, aluminum, or another conductive material. Electrically, the shaft connector 502 is connected to the ground side of the cable 116. An insulated wire from the probe connector 501 to the high voltage electrode 602 passes through the center of the shaft connector 502. For a 2 inch borehole 122, the shaft connector could be about 1.75 inches in diameter.

The shaft 503 is a hollow shaft that may be threaded 507 at one (or both) ends. The shaft 503 made of stainless steel, copper, aluminum, or another conductive material. Electrically, the shaft 503 is connected to the ground side of the cable 116 through the shaft connector 502. An insulated wire from the probe connector 501 to the high voltage electrode 602 passes through the center of the shaft 503. Mechanically, the shaft 503 is connected to the shaft connector 502 as described above. At the other end, the shaft 503 is connected to the cage 506 through the threaded bolt 508 into the shafts threads 507, or through another mechanical connection (welding, set screws, etc). The shaft 503 may be circular and 1.5 inches in diameter in a 2 inch borehole 122 application. The shaft may be 40 inches long, in one embodiment. At several intervals in the shaft, blast force inhibitors 504a, 504b, 504c may be placed to inhibit the escape of blast wave and the blasting media 104 during the blast. The blast force inhibitors 504a, 504b, 504c may be made of the same material as the shaft 503 and may be welded to the shaft, machined into the shaft, slip fitted onto the shaft or connected with set screws. The inhibitors 504a, 504b, 504c could be shaped as a donut.

The shaft 503 connects to the cage 506 through a threaded bolt 508 that threads into the shaft's threads 507. This allows adjustment of the positioning of the cage 506 and the blast. Other methods of connecting the cage 503 to the shaft 506 could be used without deviating from the invention (for example, a set screw or welding). The cage 506 may be circular and may be 1.75 inches in diameter. The cage 506 may be 4-6 inches long, and may include 4-8 holes 604 in the side to allow the blast to impact the side of the blast hole 122. These holes 604 may be 2-4 inches high and may be 0.5-1 inch wide, with 0.2-0.4 inch pillars in the cage 506 attaching the bottom of the cage 506 to the top. The cage 506 could be made of high strength steel, carbon steel, copper, titanium, tungsten, aluminum, cast iron, or similar materials of sufficient strength to withstand the blast. Electrically, the cage 506 is part of the ground circuit from the shaft 503 to the ground electrode 601.

In an alternative embodiment, a single blast cage could be made of weaker materials, such as plastic, with a wire connected from the shaft to the ground electrode 601 at the bottom of the cage 506.

The details of the cage 506 can be viewed in FIG. 6. A ground electrode 601 is located at the bottom of the cage 506. The ground electrode 601 is made of a conductive material such as steel, aluminum, copper or similar. The ground electrode 601 could be a bolt screwed in female threads at the bottom of the cage 506. Or a nut could be inserted into the bottom of the cage for threading the bolt 601 and securing it to the cage 506. The bolt 601 can be adjusted with washers or nuts on both sides of the cage 506 to allow regulate the gap between the ground electrode bolt 601 and the high voltage electrode 602, depending upon the type of solid 102.

The wire that runs down the shaft 503, as connected to the cable 116 at the probe connector 501, is electrically connected to the high voltage electrode 602. A dielectric separator 603 keeps the electricity from coming in contact with the cage 506. Instead, when the power is applied, a spark is formed between the high voltage electrode 602 and the ground electrode 601. In order to prevent the spark from forming between the high voltage electrode 602 and the cage 506, the distance between the high voltage electrode 602 and the ground electrode 601 must be less than the distance from the high voltage electrode 602 and the cage 506 walls. The two electrodes 601, 602 are on the same axis with the tips opposing each other. If the cage is 1.75 inches in diameter, the cage 506 walls will be about 0.8 inches from the high voltage electrode 602, so the distance between the high voltage electrode 602 and the ground electrode 601 should be less than 0.7 inches. In another embodiment, an insulator could be added inside the cage to prevent sparks between the electrode 602 and the cage when the distance between the high voltage electrode 602 and the ground electrode 601 is larger.

This cage 506 design creates a mostly cylindrical shock wave with the force applied to the sides of the borehole 122. In another embodiment, additional metal or plastic cone-shaped elements may be inserted around lower 601 and upper electrodes 602 to direct a shock wave outside the probe and to reduce axial forces inside the cage.

In one embodiment, a balloon filled with water could be inserted in the cage 506 or the cage 506 could be enclosed in a water filled balloon to keep the water around the electrodes 601, 602 in a horizontal or upside down application.

The method of and apparatus for plasma blasting described herein has numerous advantages. Specifically, by adjusting the blasting probe's tip and thereby the electrode gap, the plasma blasting system is able to provide better controll over the power deposited into the specimen to be broken. Consequently, the power used is able to be adjusted according to the size and tensile strength of the solid to be broken instead of using the same amount of power regardless of the solid to be broken. Furthermore, the system efficiency is also increased by using a thixotropic or reactive materials (RIM) blasting media in the plasma blasting system. Specifically, the thixotropic or RM properties of the blasting media maximize the amount of force applied to the solid relative to the energy input into the system by not allowing the energy to easily escape the borehole as described above and to add energy from the RM reaction. Moreover, because the thixotropic or RIM blasting media is inert, it is safer than the use of combustible chemicals and/or explosives. As a result, the plasma blasting system is more efficient in terms of energy, safer in terms of its inert qualities, and requires smaller components thereby dramatically decreasing the cost of operation.

Accordingly, for the mining and civil construction industries this will represent more volume of rock breakage per blast at lower cost with better control. For the public works construction around populated areas this represents less vibration, reduced noise and little to no flying rock produced. For the space exploration industry where chemical explosives are a big concern, the use of this inert blasting media is an excellent alternative. Overall, the method of and apparatus for plasma blasting described herein provides an effective reduction in cost per blast and a higher volume breakage yield of a solid substance while being safe, environmentally friendly and providing better control.

Plasma Blasting to Identify Soil Structures

The above probes in FIG. 2, 3 and in FIG. 5, 6 can be used to create shock waves in the ground to map soil structures, such as is done in oil and gas exploration. In this embodiment, a borehole 122 is drilled in the ground 102. Blasting probe 118 or probe 500 is inserted into the borehole 122. Alternatively, directional probe 1000 could be used in some applications. The energy from the energy storage unit 108 to create the plasma blast is adjusted prevent the blast from breaking the surrounding soil, but providing enough energy that the blast creates shock waves in the ground 102. The plasma blasts could also be done in water in an alternative embodiment, such as for deep water oil and gas exploration.

The shock waves travel from the probe 118, 500, 1000 through the ground 102 (or water) where the shock waves are reflected off of the various structures in the ground 102 (or water). These reflections are then detected by sensors places on or in the ground (or water). These sensors could be acoustic sensors or seismic sensors (geophones or hydrophones) in known locations relative to the position of the source. The recorded signals are then subjected to specialist processing and interpretation to yield comprehensible information about the subsurface.

Precision Mapping of Utilities Using Plasma Blasting

Plasma blasting can also be done above ground, sending the shock waves onto the surface of the ground. For utility companies in cities, precise mapping of the location of wires, pipes, conduit, etc. is important to efficiently and safely access a wire or pipe. Traditional methods can require excessive excavation to locate the desired wire or pipe, with great care taken not to impact other utilities.

Figure 7:
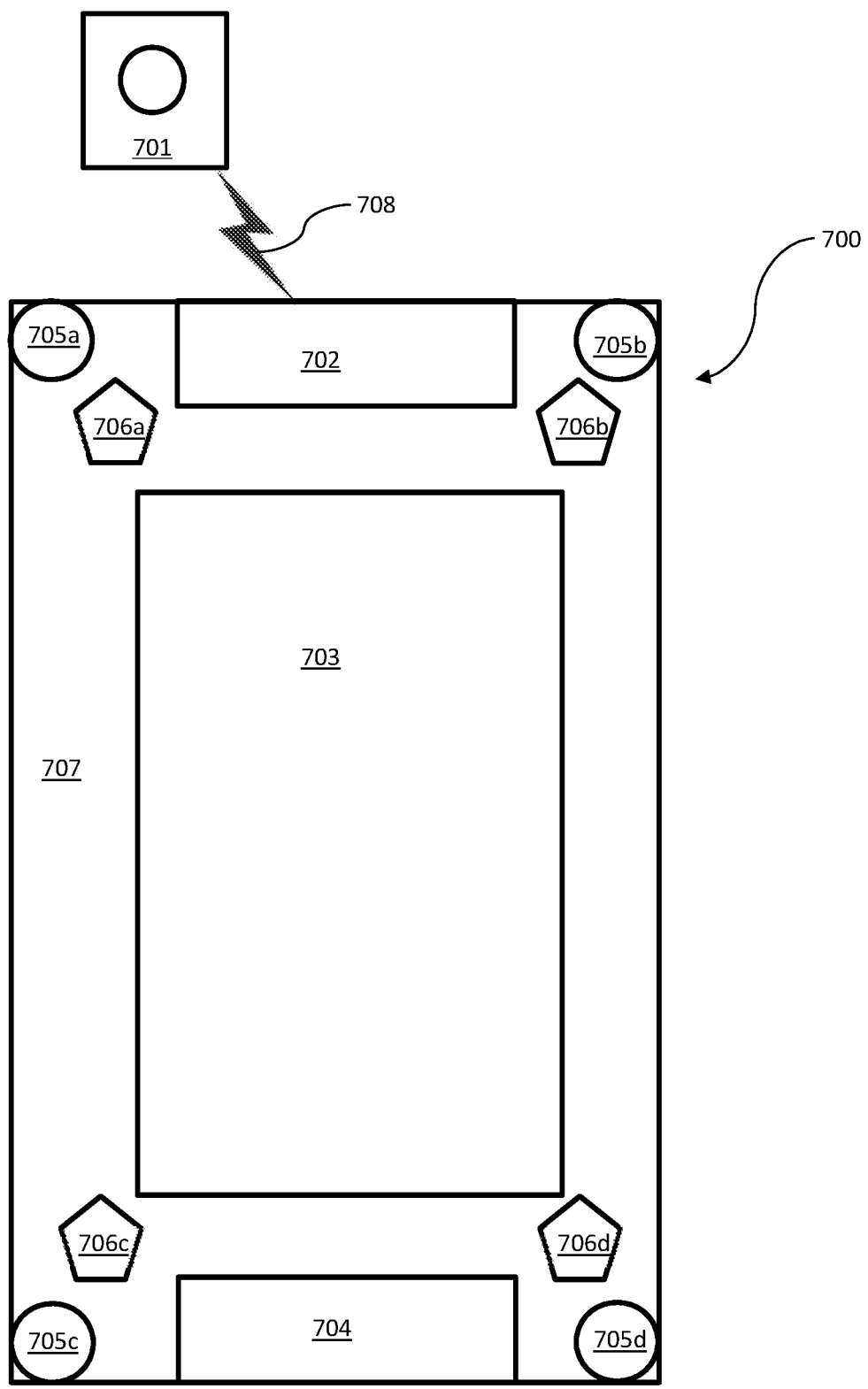
FIG. 7 shows a platform for mapping underground utilities.

Looking to FIG. 7, we see a platform 700 for precision mapping of utilities in the ground. This platform 700 could be driven on and off of a truck or trailer. The platform 700 could include a power source 704 such as a battery, plugged into an AC power outlet, or could be powered by a gasoline or diesel autonomous motor-generator or any other power source. The power source 704 could also include capacitors 110 or other source of power for the plasma blast. The platform 700 could be mounted on four wheels 705a, 705b, 705c, 705d for moving the platform 700 in any direction with precision. The wheels 705a, 705b, 705c, 705d could be omni-wheels or Mecanum wheels. One or more of the wheels 705a, 705b, 705c, 705d could be powered by individual motors or by a mechanical connection to a motor. Wheels 705a, 705b, 705c, 705d are mounted below the platform, and contact with the ground 102. Wheels 705a, 705b, 705c, 705d could be could also include a suspension system to keep the platform 700 relatively level as it traverses the ground 102.

The platform 700 could be a steel or aluminum frame, welded in a rectangle with a decking 707 material for holding various components 702, 704, 706a, 706b, 706c, 706d. The decking 707 material could be sheet metal, aluminum, plastic, wood, or similar materials. In the middle of the decking 707 is a rectangular frame 703 for the transmitters (plasma blast probes) and receivers (sensors).

One or more GPS receivers 706a, 706b, 706c, 706d are secured in precise locations on the decking 707 to determine exactly where the platform 707 is located and how the platform is oriented. In some embodiments, the GPS receivers 706a, 706b, 706c, 706d could be replaced or supplemented with other location technologies, such as IPS, cell tower triangulation, or beacon technology.

A special purpose controller 702 is also located on the decking 707. The special purpose controller 702 is shielded to protect the controller from electrical, magnetic, and mechanical interference from the plasma blasts. The controller 702 could include a special purpose microprocessor, memory, a mass storage device (hard disk, CD or solid state drive), IO interfaces to the probes 118, 500, 1000 and the sensors, power conditioning equipment, a Bluetooth interface, a network interfaces (could be WiFi, Cellular, wired Ethernet, or similar).

The controller 702 could be connected to a 3-D joystick 701 for controlling the movement of the platform 700. The connection 708 between the controller 702 and the joystick 701 could be Bluetooth, Wi-Fi, cellular, or hardwired. The joystick 701 could be used to drive the platform 700 off of the truck or trailer, to assist with positioning (although positioning could also be done automatically based on specific GPS coordinates), or to move the platform to s specific location. In some embodiments, the joystick 701 could be replaced with a laptop, a server, a smartphone, or similar device using other user interface technologies (dual joysticks, touchscreens, keyboard input, voice commands, and similar devices).

The network interface could be used to transmit and receive data from remote servers that process or record the received from the sensors. The processing of the data from the sensors could be handled locally on the microprocessor or remotely on a server.

In some embodiments, the platform 700 also includes a drill for making boreholes and a rock breaking plasma blasting probe 118, 500. This allows the platform 700 to both map the underground structures and to then to use that map to break up the underground structure with precision to access pipes or wires with the minimum of excavation. In some embodiments, once the structure is mapped, a large, course plasma blast is used to get to the correct area, and then more precise plasma blasts are used to delicately break the material around the pipe.

The controller 702 could operate algorithms to control the separation of the electrodes in the probe 118, 500, 1000 and the amount of energy (varying voltages and/or the number of capacitors) sent to the probe to create the spark/plasma blast. In addition, the controller 702 could control length of time that the spark is present and the timing of one or more plasma blasts if multiple blasts are desired. By controlling these factors the characteristics of the plasma blast can be controlled with precision. Other algorithms could take soil conditions into account for the determination of the blast characteristics to use.

Figure 8:
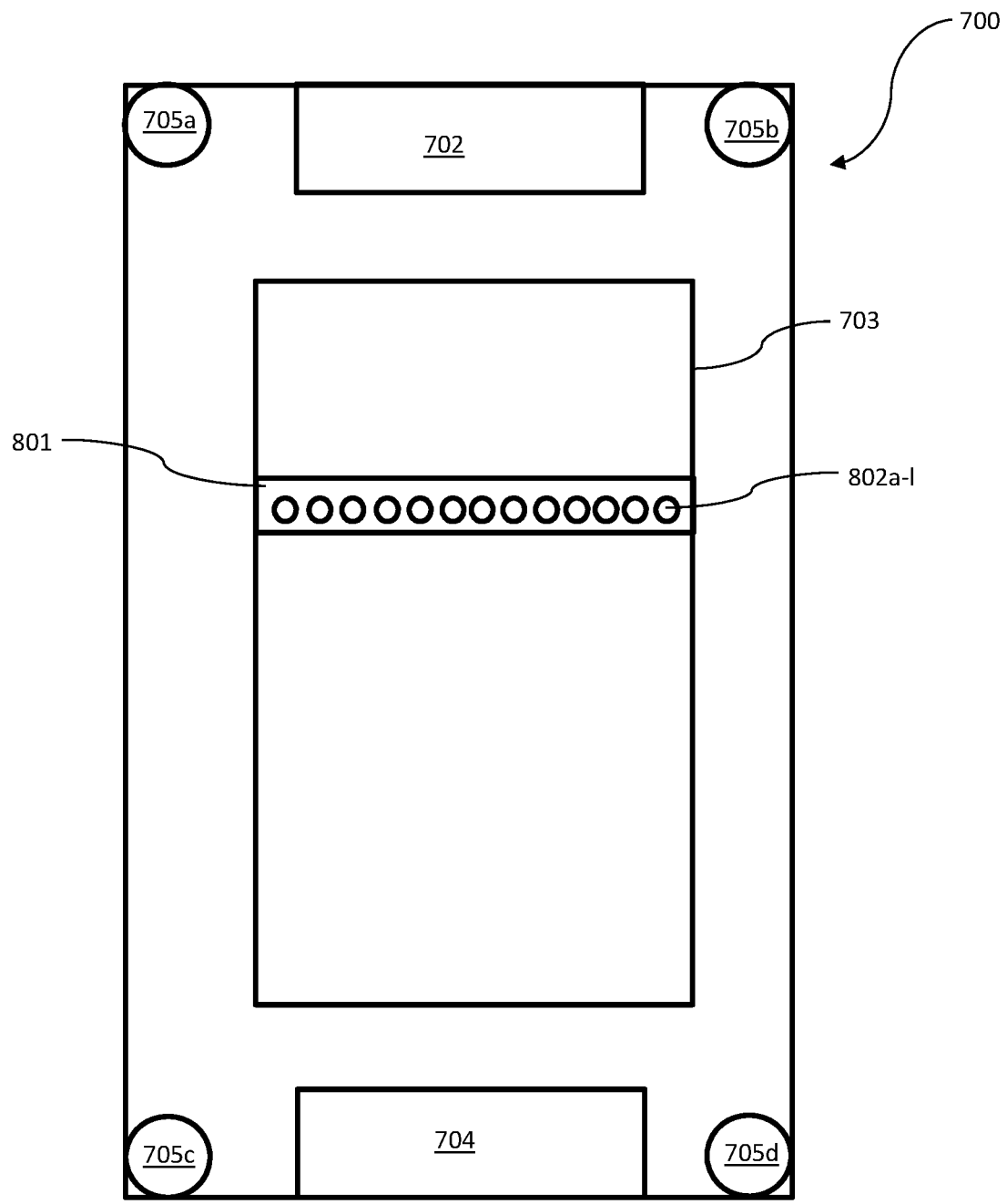
FIG. 8 shows the platform with the plasma blast probe rail.

Turning to FIG. 8, we see the details of the plasma blasting frame 703. The frame 703 contains a rack 801 of plasma blasting probes 802a-l. The probes 802-l could be one probe with a number of different positions along the rack 801 (moved manually or with a stepper motor), or it could be a number of different probes mounted on the rack 801. Rack 801 moves along the frame 703 by means of a stepper motor or similar method for movement (including manual movement by an operator). When blasting, the probes 802a-l are fired sequentially, and the sensors record the shock wave reflections in the controller 702. Before firing, each probe 802a-l is moved down to make contact with the ground 102. Once each position 802a, 802b, . . . , 802l are fired, the rack 801 moves to another position on the frame 703, and the process in repeated. Once all positions on the frame 703 are completed, the controller 702 or the server processes the recorded reflection data and produces a map of the structure of the ground below the platform 700. Note that any number of probe 802a-l locations can be used and any number of positions of the rack 801 on the frame 703 without deviating from this aspect of the invention. In another embodiment, rather than a movable rack 801, the probes 802a-l could be arranged in a grid on the frame 703, such that the only movement is to make the probe contact the ground 102 before firing, Each probe 802a-l is electrically connect to the IO interface of the controller 702, and the controller controls the time and energy used for the plasma blast.

Figure 9:
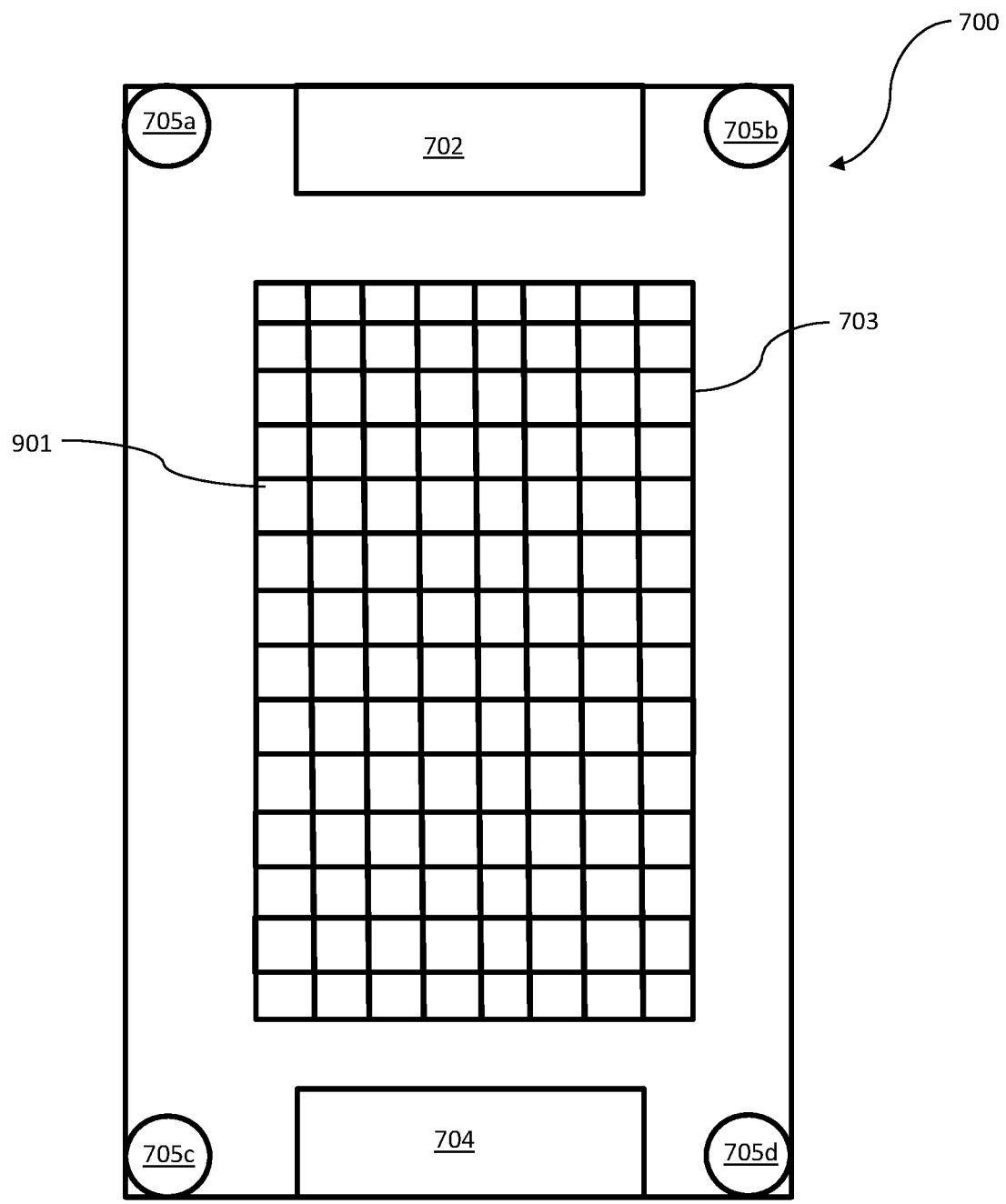
FIG. 9 shows the grid of receiving sensors on the platform.

FIG. 9 shows the frame 703 with a grid of sensors 901 for detecting the shock waves after the plasma blast. Any number of sensors can be on the grid 901, each configured to sense the reflections of the shock wave on the ground 102. Each sensor is electrically connected to the IO interface of the controller 702 for sending the reflected shock waves to the controller 702 for storage. The controller 702 stores the sensor location, the precise time, and the amplitude of the detected shock wave as well as the precise location and time of the plasma blast.

In another embodiment, the plasma blast probes and the sensors could be replaced with other devices to create test waves and to detect reflected waves, such as ultrasound devices, and/or radar devices.

Figure 10:
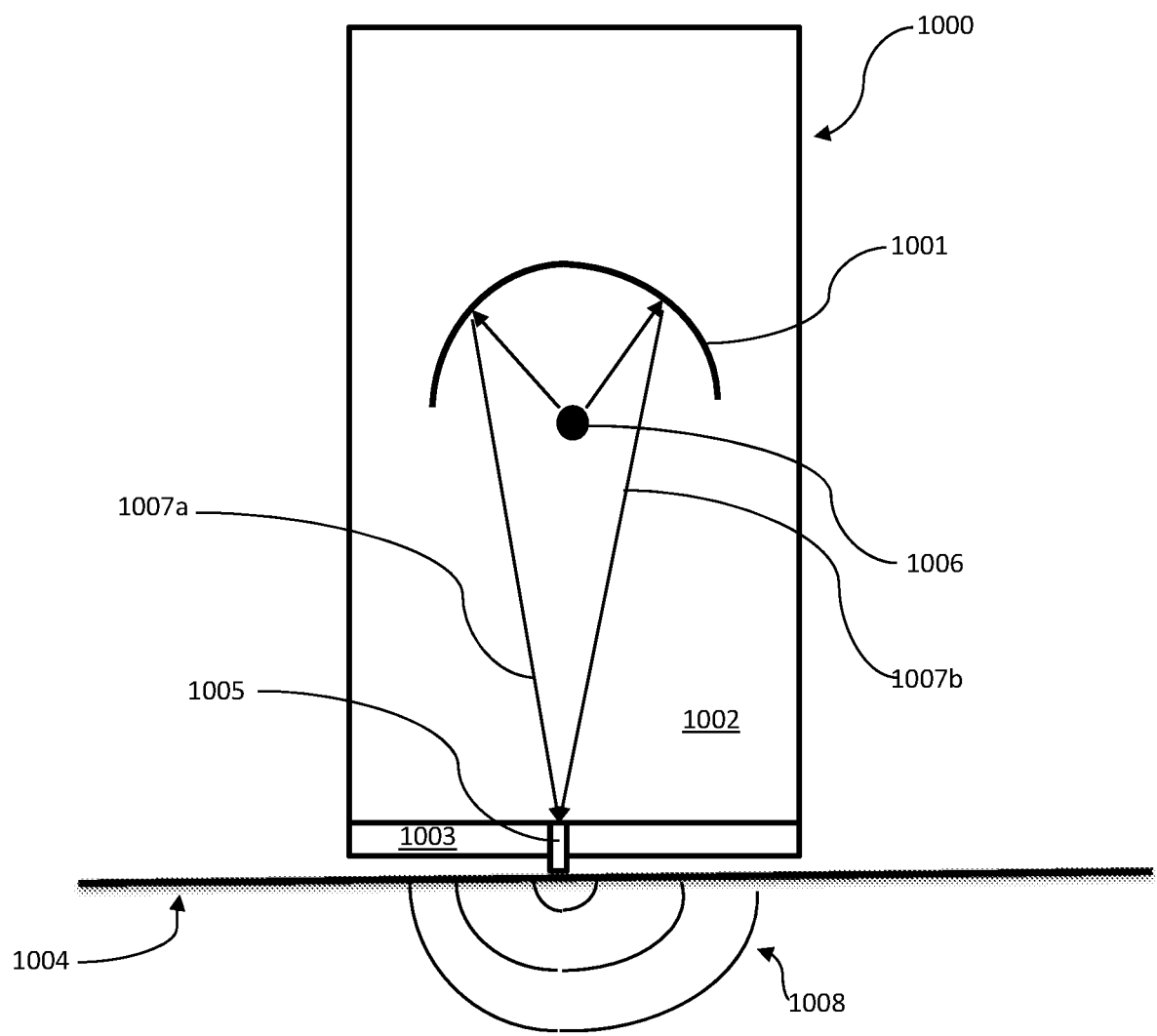
FIG. 10 shows plasma blast probe for creating the shock waves.

FIG. 10 is a diagram of a directional probe 1000 such as could be used on the platform 700 as probes 802a-l. The directional probe 1000 could be a cylinder with a flat top and bottom. The directional probe 1000 could be made of rugged material such as steel, iron, or similar. The top of the probe 1000 is attached but not sealed, so that shock waves and air can escape if necessary during a plasma blast. The probe 1000 is filled with blasting media 104 such as water. Inside the probe 1000 is a parabolic mirror 1001 that is made of steel or other rugged material. The parabolic mirror 1001 is attached to the walls of the probe 1000. The bottom of the probe 1000 is completely attached, perhaps welded, to the walls of the probe 1000. A layer of rubber 1003 (or similar material) is placed on the bottom of the probe 1000. In the center of the bottom the probe 1000 is a hole (both in the rubber 1003 and in the bottom of the probe 1000) with a mechanical steel (or similar material) slug 1005. The parabolic mirror 1001 is aimed so that the shock waves 1007a, 1007b from a plasma blast 1006 are focused on the slug 1005. This causes the focused energy on the slug 1005 to be transferred to the pavement or a road surface 1004 (or similar solid surface), causing shock waves 1008 to be transferred to the ground 102. If there is no pavement nor road surface, a steel plate (or similar) could be placed on the ground, and the shock waves directed through the steel plate.

The plasma blast 1006 is caused by a spark between a plurality of electrodes positioned within the directional probe 1000. A description of the electrode functionality and connections can be found elsewhere in this document.

The shock wave 1008 travels through the ground 102 until it hits an underground structure. Upon hitting the underground structure, reflections from the structure return to the surface of the ground, and are picked up by the array of sensors 901.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

The foregoing devices and operations, including their implementation, will be familiar to, and understood by, those having ordinary skill in the art.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A utility detection system comprising:
   a platform;
   three wheels attached to the platform;
   a frame mounted on a deck of the platform;
   the frame incorporating a plurality of sensors;
   the frame further incorporating one or more plasma blasting probes, wherein the probes comprises:
      a probe housing in a shape of a cylinder;
      a plurality of electrodes positioned in the probe housing;
      said electrodes positioned in a central location within a parabolic mirror;
      a slug positioned at a bottom of the probe housing;
      where the parabolic mirror focuses shockwaves from a plasma blast caused by an arc between the plurality of electrodes onto the slug.

2. The utility detection system of claim 1 further comprising a special purpose controller mounted on the platform and electrically connected to the plurality of sensors and to the electrodes.

3. The utility detection system of claim 2 wherein the controller executes an algorithm that automatically determines an amount of energy sent to the electrodes.

4. The utility detection system of claim 3 wherein the controller executes an algorithm that automatically determines a timing of the energy sent to the electrodes.

5. The utility detection system of claim 2 wherein the controller executes an algorithm that creates a map of underground structures based on data from the plurality of sensors.

6. The utility detection system of claim 5 wherein the algorithm further determines a precision of the map.

7. The utility detection system of claim 5 wherein the underground structures are gas lines.

8. The utility detection system of claim 2 further comprising a borehole drilling mechanism and a downhole blast probe.

9. The utility detection system of claim 8 wherein the controller executes an algorithm that automatically calculates parameters of the plasma blast to fracture underground structures.

10. The utility detection system of claim 9 wherein the algorithm that automatically calculates the parameters of the plasma blast first coarsely fractures the underground structures and later precisely fractures the underground structures.

11. A method for detecting underground utilities comprising:
   initiating a plasma blast between a plurality of electrodes positioned within a plasma blasting probe, where the plurality of electrodes are positioned in a central location inside of a parabolic mirror, wherein the parabolic mirror is designed to focus shockwaves from the plasma blast onto a slug, the slug in contact with a surface;
   detecting, with sensors, reflections from the shockwaves of underground structures;
   executing an algorithm on a special purpose controller to process signals from the sensors representing the reflections of the shockwaves;
   mapping the location of the underground structures from the signals by the special purpose controller.

12. The method of claim 11 wherein the plasma blasting probe comprises a housing in a shape of a cylinder.

13. The method of claim 11 further comprising executing, by the special purpose controller, an algorithm that automatically determines an amount of energy sent to the electrodes.

14. The method of claim 11 further comprising executing, by the special purpose controller, an algorithm that automatically determines a timing of energy sent to the electrodes.

15. The method of claim 11 further comprising executing, by the special purpose controller, an algorithm that creates a map of the underground structures based on data from the plurality of sensors.

16. The method of claim 15 wherein the algorithm further determines a precision of the map.

17. The method of claim 15 wherein the underground structures are power lines.

18. The method of claim 11 further comprising drilling a borehole using a drilling mechanism and a downhole blast probe.

19. The method of claim 18 further comprising executing, by the special purpose controller, an algorithm that automatically calculates parameters of the plasma blast to fracture the underground structures.

20. The method of claim 19 wherein the algorithm that automatically calculates the parameters of the plasma blast first coarsely fractures the underground structures and later precisely fractures the underground structures.

\* \* \* \* \*